United States Patent
Lough et al.

(10) Patent No.: US 6,649,122 B1
(45) Date of Patent: Nov. 18, 2003

(54) AQUEOUS COLORANT SYSTEM FOR INCORPORATION INTO PLASTICS

(76) Inventors: Larry L. Lough, 19000 Lake Rd., Rocky River, OH (US) 44216; John V. Standish, 2433 Brunswick La., Hudson, OH (US) 44236; Michael A. Jacobs, 4055 Shelley Dr., North Olmsted, OH (US) 44070

( * ) Notice: Subject to any disclaimer, the term of this patent is extended or adjusted under 35 U.S.C. 154(b) by 0 days.

(21) Appl. No.: 09/545,014

(22) Filed: Apr. 7, 2000

Related U.S. Application Data

(60) Provisional application No. 60/128,327, filed on Apr. 8, 1999.

(51) Int. Cl.$^7$ ............................................. B29C 49/02
(52) U.S. Cl. ........................ 264/523; 264/165; 264/310; 264/319; 264/328.8
(58) Field of Search ................................ 264/523, 165, 264/310, 319, 328.18

(56) References Cited

U.S. PATENT DOCUMENTS

| | | | |
|---|---|---|---|
| 3,956,008 A | | 5/1976 | Knepper et al. |
| 3,966,488 A | * | 6/1976 | Langenfelder et al. ...... 106/493 |
| 3,992,343 A | | 11/1976 | Haschke et al. |
| 4,091,034 A | | 5/1978 | Kuhn |
| 4,167,503 A | | 9/1979 | Cipriani |
| 4,169,203 A | | 9/1979 | Wingard et al. |
| 4,341,565 A | | 7/1982 | Martenson |
| 4,571,416 A | | 2/1986 | Jarzombek et al. |
| 4,634,471 A | | 1/1987 | Foye et al. |
| 4,804,719 A | | 2/1989 | Weaver et al. |
| 4,910,236 A | | 3/1990 | Foye et al. |
| 5,043,376 A | | 8/1991 | Sharma et al. |
| 5,104,913 A | | 4/1992 | Sharma et al. |
| 5,308,395 A | | 5/1994 | Burditt et al. |
| 5,328,506 A | * | 7/1994 | Crumbley et al. .......... 106/416 |
| 5,759,472 A | | 6/1998 | DeFranco et al. |
| 6,428,733 B1 | * | 8/2002 | Zwart .......................... 264/310 |

* cited by examiner

*Primary Examiner*—Suzanne E. McDowell
(74) *Attorney, Agent, or Firm*—Fay, Sharpe, Fagan, Minnich & McKee, LLP

(57) ABSTRACT

A liquid colorant system for plastics comprising from about 10 percent to about 80 percent by weight colorant; from about 0.5 percent to about 30 percent dispersant; and, from about 25 percent to about 90 percent water.

5 Claims, No Drawings

AQUEOUS COLORANT SYSTEM FOR INCORPORATION INTO PLASTICS

This application claims the benefit of Provisional Application Serial No. 60/128,327 filed Apr. 8, 1999.

FIELD OF THE INVENTION

The present invention concerns an aqueous colorant. More particularly, the invention concerns an aqueous colorant for incorporation into plastics and a method for use of such an aqueous colorant.

BACKGROUND OF THE INVENTION

Traditionally, color has been incorporated into plastic materials by a variety of different methods. These methods include (i) pre-colored plastics which mix pigments and/or dyes with a polymer melt in a compounding process (ii) pellet concentrate where a dry color containing pellet is mixed with an uncolored virgin resin at the process equipment (iii) dry color concentrates which can be added to process equipment while making the finished parts, and (iv) liquid color concentrates where pigments are mixed with an organic liquid carrier.

When developing a product to color thermoplastic resins, the skilled artisan will consider the handling, storage, incorporation and dispersion characteristics of a delivery system. Each of the above described colorant systems provide advantageous characteristics. However, each colorant system also demonstrates drawbacks.

With respect to solid systems, handling, precision and cleanliness of the work environment are concerns. For example, the effect of the carrier resin on the characteristics of the colored thermoplastic resin can be a concern in pellet based systems. Similarly, solid colorants often do not uniformly mix with the plastic, do not disperse uniformly during molding, and can segregate from the plastic during pre-molded handling.

To address some of these concerns, some artisans use colorant dispersion phase transfer pigments from an aqueous to a non-aqueous phase, in discrete form, while still in an unconcentrated slurry through preferential wetting by surface contact between the pigment and a hydrophobic polymer solution emulsified in water. This material can then be concentrated in a plate and frame press or by flocculation, flotation or settling. After filtration, the resultant material ("a phase-transferred presscake") somewhat resembles conventional presscake, but contains an organic phase as well as only 10 to 45 percent water, whereas conventional presscake contains 55 to 90 percent water. This type of pigment-hydrophobic organic vehicle product is disclosed in U.S. Pat. No. 4,634,471. Importantly, the emulsion and the pigment slurry mixture is forced through a concentration zone and flushed with a hydrophilic organic vehicle. Accordingly, introduction of the colorant to the plastic material is via a liquid organic medium.

Liquid color concentrates have also become increasingly attractive to overcome the drawbacks of traditional solid colorants. For example, in U.S. Pat. No. 3,956,008, a liquid colorant dispersion for plastics is disclosed which is comprised of 5–70 weight percent colorant and 95–30 weight percent vehicle. The vehicle is stated to be comprised of two major components, 1) from 5–25 weight percent of a physically-active, chemically-inert solid in the form of fine particles, and 2) from 95–75% of a surfactant system. The preferred surfactant system is stated to be a sorbitan ester surfactant, such as sorbitan trioleate. The applicability of this system, however, has been substantially limited because the carrier may experience pigment settling, incompatibility with the host polymeric material, insufficient heat stability causing processing problems, interference with the mechanical and physical properties of the end-product, or any combination of these undesirable factors.

Several techniques have also been developed in order to better achieve uniform dispersion and storage stable liquid colorant concentrates. For example, U.S. Pat. Nos. 3,956,008 and 4,167,503 disclose colorants having surfactant based vehicles that improve pigment dispersion and allow relatively high pigment loadings at viscosities suitable for use in standard in-line metering equipment. In the '503 patent, a liquid carrier system for dispersing into polymeric compositions is disclosed as comprised of an alkylated phenoxy poly(ethyleneoxy) ethanol carrier wherein the alkyl moiety of the ethoxylated phenol is selected from the group consisting of phenols and substituted phenols and a colorant in an amount from 0.1% to 80% based on the weight of the carrier.

U.S. Pat. No. 4,341,565 discloses a liquid gel colorant that comprises a suspension of organic pigments in a liquid vehicle that is a plasticizer and which is gelled by an organophilic, expanding lattice clay that is ion exchanged with alkyl ammonium ions. The gel is modified by the addition of certain hydroxyalkyl fatty amines or fatty imidazolinium quaternaries, while the plasticizer is stated to be, for example, esters of saturated mono- or di-basic alcohols or tri-basic, saturated aliphatic or aromatic acids, or phosphoric acids.

In U.S. Pat. No. 4,571,416, a polyolefin compatible liquid colorant concentrate is disclosed that is a dispersion of a colorant and/or other additive in a non-surfactant based vehicle. The vehicle includes a low molecular weight addition polymer and an essentially non-volatile solvent for the low molecular weight addition polymer. The vehicle may also contain a dispersion aid, such as oleic acid, especially when the colorant is an inorganic pigment. The concentrate is stated to be comprised of a vehicle containing a low molecular weight addition polymer, such as polybutylene, polystyrene, polyalpha-methyl styrene/vinyl toluene copolymer or an acrylic copolymer and an essentially non-volatile solvent for the low molecular weight polymer which has a boiling point of at least about 450° F.

Turning next to U.S. Pat. No. 5,308,395, a liquid concentrate for incorporation into polymeric resins is disclosed as comprised of a vehicle of at least one organic rosin material, at least one surfactant, and at least one colorant or additive.

U.S. Pat. No. 5,759,472, provides a rare disclosure of a liquid color system including even a minor amount of water. More particularly, the liquid color system includes from about 10% to about 75% by weight carrier, from about 0% to about 15% by weight water, from about 0.01% to about 10% by weight dispersant, and from about 10% to about 80% by weight colorant. The carrier is stated to be a material selected from the group consisting of propylene glycol, ethylene glycol, diethylene glycol, tri(ethylene glycol), glycerine, and mixtures of such materials.

Accordingly, liquid colorant systems have relied on an organic vehicle. Thus, there has previously been no disclosure of an aqueous based system for use as a color concentrate for the coloration of plastic material. This focus on organic vehicles in the art may arise because in injection molding, for example, a common surface defect in molded parts is "splay," which is the result of moisture in the resin. Splay is eliminated by drying the resin in an oven or hopper dryer prior to use. Similarly, steam generated from moisture can cause foaming in parts that reduces strength. Accordingly, there is no motivation in the art, and in fact, a recognized reason to avoid use of any material in treating plastics which contains significant quantities of water.

Of course, this perception has been carried forward to liquid colorant systems, which as shown above, rely on organic vehicles. Notwithstanding this prior reluctance to utilize water in liquid colorant systems, the present invention is directed to an aqueous based liquid colorant system demonstrating an excellent ability to color various thermoplastic materials in many commonly used molding or extrusion operations.

SUMMARY OF THE INVENTION

The present invention provides a new and improved liquid colorant system that is designed for the coloring of plastics. The invention more particularly relates to a liquid colorant system comprised of a colorant, a dispersant and at least 25% water. The colorant system is particularly suited to use in injection molding, extrusion, blow molding and rotational molding of plastic materials.

It is an advantage of the present invention to achieve a higher pigment loading than organic systems.

It is a further advantage of the present invention to achieve higher color strength for many pigments.

It is a further advantage of the present invention to achieve better color incorporation, temperature uniformity, better shelf stability and reduced screw slippage in extruders.

It is a further advantage of the present invention to provide an aqueous colorant that adheres well to resin pellets, even after water flash-off, without creating a significant powder build up in a premixer The foregoing and other features of the present invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The liquid color system of the present invention comprises a dispersant, a colorant and water. The system may optionally also contain other traditional additive(s). Specifically, the present invention is directed to a liquid colorant system comprised of at least 10 to 80%, preferably 30 to 70% of a pigment or dye, at least greater than 0, preferably 0.5 to 30%, and more preferably 10 to 20% dispersant, and the balance water and other traditional additive(s). Preferably, at least 30%, more preferably, 40% of the liquid colorant system will be comprised of water and at least 40%, more preferably at least 50% will be colorant.

The term "colorant" when used throughout this specification and in the appended claims, denotes any conventional inorganic or organic pigment, dyestuff, or carbon black. Those skilled in the art will be aware of suitable inorganic pigments, organic pigments and dyestuffs. Such materials are described, for example, in Kirk Orthmer Encyclopedia of Chemical Technology, Third Edition, vol. 19, pp. 1–78 which is incorporated by reference herein; however, examples include:

(1) inorganic types such as titanium dioxide, carbon black, iron oxide, zinc chromate, cadmium sulfides, chromium oxides, sodium aluminum silicate complexes, such as ultramarine pigments, metal flakes and the like; and (2) organic types such as azo and diazo pigments, phthalocyanines, quinacridone pigments, perylene pigments, isoindolinone, anthraquinones, thioindigo, solvent dyes and the like.

Accordingly, this invention may be employed in conjunction with the. production of many different pigments. Since the scientific nomenclature for dyes and pigments is very difficult, trade names are used extensively in speaking of them. In this regard, examples of pigments for which this invention is applicable include but are not limited to: Pigment Red 1, Pigment Red 3, Pigment Red 4, Pigment Red 48:1, Pigment 48:2, Pigment Red 48:4, Pigment Red 49:1, Pigment Red 49:2, Pigment Red 53:1, Pigment Red 52, Pigment Red 57, Pigment Red 81, Pigment Red 190, Pigment Orange 13, Pigment Orange 19, Pigment Orange 46, Yellow 12, Pigment Yellow 13, Pigment Yellow 14 Pigment Yellow 17, Pigment Yellow 27, Pigment Yellow 83, Pigment Green 7, Pigment Green 36, Pigment Blue 6, Pigment Blue 15:3, Pigment Blue 61.

The dispersant, alternatively referred to as a surfactant, that is utilized in the liquid color system is dependent upon the type of colorant being used. Moreover, the primary requirement is that the dispersant is soluble in the carrier (i.e. water) and it associates strongly with the particles of colorant as they are separated from each other during mixing, thereby preventing the particles from reattaching to each other during storage and use. Examples of suitable dispersants include polyvinylpyrrolidone (e.g., Sokalan HP50 from BASF), sodium salt of polyacrylic acid (molar mass from 1,200–250,000), sodium/iron salt of lignosulfonic acid, sodium salt of condensed naphthalenesulfonic acid, sodium naphthalene sulfonate and sodium or ammonium salts of polymeric carboxylic acid, amine alkyl sulfonates, bisridecyl esters of sodium sulfosuccinic acid, block copolymers of ethylene oxide and propylene oxides as well as many others. Additional examples of surface active agents which may be employed are the sodium salts of high molecular weight fatty alcohol sulfates, such as sodiumlauryl sulfate, sodium lignin sullfonates, the dioctyl ester of sodium sullfosuccinic acid, polyalkylene oxide condensation products, such as polyethylene oxides, quaternary ammonium salts, the sodium sulfonates of oleic acid esters of aliphatic compounds, sodium salts of aryl alkyl polyether sulfonates, and the like.

Preferably, the dispersing agent (alternatively referred to as a surfactant) will be non-ionic such as those selected from nonyl-phenols, octyl-phenols, acetylenic diols, or ethoxylated sorbitol esters. However, the dispersant can also be anionic such as any of those known to the skilled artisan. In fact, the invention is not intended to be limited to any specific dispersant agent. Rather, any suitable compound which increases the stability of the pigment/dye in water is suitable.

The concentrates of the present invention may be used to color or incorporate additives into a wide variety of polymeric resins but finds particular application in modification of thermoplastic resins. For example, the color concentrates of the invention are generally compatible with, and may be used with, but not limited to, the following resins: polyolefins such as LLDPE, HDPE, LDPE, homopolymer and copolymer polypropylenes, EVA, etc.; styrenics such as crystal polystyrene, HIPS, MIPS, etc.; copolymer resins, resin blends and alloys such as ABS, polyphenylene ether (including PPO blends such as NORYL®, various engineering polymer alloys; polyamide resins, such as Nylon 6, 6/6, 11, 12, copolymers, terpolymers, etc.; acrylic resins, polycarbonates, and other amorphous resins; polyesters, such as PET, PBT, and others—both thermoplastic and curing, as well as resins reinforced with glass, quartz, carbon, aramid, or the like, fibers.

Typical examples of the additives which are suitable for use with the carrier of this invention include:

Antistatic Agents. Suitable are those products which are stable at temperatures above 200° C.

UV Stabilizers. Such as benzophenones, benzotriazoles, sterically hindered amines, and other types.

Flame Retardants. Such as phosphate esters, halogenated organic and inorganic materials, aluminum and antimony oxides, and the like.

Heat Stabilizers. Organo-tins, calcium, barium, strontium/ tin, barium.cadmium/zonc phosphites, and the like.

Mold Release/Lubricants/Slip Agents. Metal stearates and stearic acid, silicone oils, glycerol and polyglycerol esters, amides, derived from fatty acids, and others.

Foaming Agents. Tetrazole type, trihydrazide triazine type, hydrazine derivatives, p-oluene sulfonyl semicarbazide, and many others.

Filler Reinforcing Materials. Calcium carbonates, aluminum trihydrate, silica and silanes, mica, glass fibers, asbestos, and others.

Suspending Agents. Such as organo-clays.

Thickeners. Such as ethyl cellulose.

Binding Agents. Such as solution acrylic polymers, ethyl cellulose, acrylic latex polymers, polyurethane latex or emulsion polymers.

The invention provides minimal impact on the molding systems with the aqueous system, in contrast to what would previously have been expected. More particularly, it was not realized that the water would vaporize off rapidly and not effect the system in a negative manner, and in fact, have less impact than many organic vehicle systems. Similarly, the near 100% volatilization of the aqueous carrier system does not effect the overall characteristics of the final molded product. In contrast, traditional organic vehicles are typically not 100% volatilized and therefore are present in the polymer and provide or create undesirable characteristics therein.

EXAMPLES

The present invention will be more fully understood from the following illustrative examples wherein all quantities, percentages and ratios are on a weight basis unless otherwise indicated. The following examples show the preparation of various liquid color systems in accordance with the present invention.

Example I

An aqueous based liquid colorant formulation consisting of 36.00% colorant (PY 199: CIBA), 1.05% dispersant (Ciba RT-280-D), 9.00% dispersant (Union Carbide Triton X-100), 9.00% UV absorber (Ciba Tinuvin 326), and 44.95% water was introduced into a polypropylene pellet colorant pre-mixer mounted on the feed throat of an injection molding machine operating at about 530 pounds polypropylene per hour. The produced container parts demonstrated high clarity with no defects at a cycle time of about 12 seconds.

Example II

An aqueous phase liquid colorant system of the formula depicted below was also evaluated in a second injection molding operation. A conventional black organic liquid colorant is typically used in the coloring of trash can lids. However, the black color which is obtained via carbon black is often difficult to disperse in the organic media because of the considerable energy required. Accordingly, the loadings are often lower than desired and the viscosity of the formulation can vary widely.

In contrast, using an aqueous carrier, comprised of 50% water, 10% dispersant (Unichema Tween 20), and 35% carbon black (Printex 30), parts were produced on a 750 ton production press fit with a premixer. At 0.15% and 0.25% use rate, the produced parts were acceptable, and, in fact, equal in quality to those made with the standard organic vehicle liquid colorant system.

The process was also evaluated without the premixer, instead using a 2 inch extruder operated at 100 pounds per hour with polyethylene, wherein the aqueous liquid colorant system was introduced into the extruder at the root of the screw of the feed system. However, it was found that the extrudate foamed in many instances. Accordingly, a preferred form of the inventive process includes utilization of a premixer in the molding process. Alternatively, another drying mechanism such as air drying or venting of an extrusion apparatus could accomplish this goal.

Example III

A red formulation of 51.27% water, 17.39% disperant (Unichema Tween 20), 17.69% pigment (Clariant PV Red HB), 7.83% pigment (Clariant HF4B), 5.22% pigment (Keystone Chomel Black), and 0.60% pigment (Holiday ultramarine blue), and a green formulation of 34.29% water, 10.00% Tween 20, 24.02% ultramarine blue, 0.05% titanium oxide, 19.09% pigment (Englehard PG50), and 12.55% pigment (Englehard PG17), were used in molding high density polyethylene pails on a 700 ton injection molding press. The shot size was 765 grams and the cycle time was about 23 seconds.

Color was introduced into a pre-mixer ahead of the feed throat. At a 0.2% use rate, the red formulation showed splay. A compressed air line was inserted into a spacer below the pre-mixer. Good parts were made with the red up to at least a use rate of 0.6%.

The green formulation was used at a 0.85% use rate with air flowing through the premixer and good parts were made immediately upon start up.

The premixer was inspected upon shut down. The pellets within the mixer were dry to the touch. The mixer cleaned up more quickly that would be the case with standard organic base colorants. A damp rag readily removed colorant residue. After about two hours of run time, there was no color build up or operational problems observed.

Example IV

PVC pipe extrusion testing was also performed. Particularly, phthalo blue (from Sun Chemical 249–1281) is often used to color PVC pipe. An aqueous dispersion colorant system was created of aqueous dispersion of 46% water, 45% phthalo blue, and 9% dispersing agent (Union Carbide Triton X 100). The colorant system was added to the feed throat of a pipe extruder and successful pipe was made immediately upon startup.

Example V

Compression molding evaluations were performed using the colorant formulation of Example II. Particularly, testing was performed on ultra-high molecular weight polyethylene parts being manufactured by compression molding. A standard organic vehicle liquid colorant was first added to the polymer prior to molding. However, the molded parts showed defects from non-mixing of the colorant. It was considered to reduce the solids loading of the colorant, but the dispersion would probably not demonstrate an adequate shelf-life staiblity because the pigments would settle out before use. Accordingly, an aqueous colorant was successfully evaluated.

Example VI

A dispersion was made of 40% red pigment, (Ciba Chromophathal red) 40% water, and 20% dispersing agent (Tween 20), 0.8% of this dispersion was mixed by hand with polypropylene stabilized with a hindered amine light stabilizer, calcium stearate, a hindered phenol anti-oxidant, and a phosphite antioxidant. Fibers were spun successfully on a Hills Laboratory fiber extruder.

Samples of fiber containing red pigment were subjected to a "crocking" test using the AATCC rotary vertical crockmeter. In this test a piece of white fabric is rubbed against the fibers and observed for color pick-up on the fabric. No color pick-up was observed. Samples of fiber containing the red pigment were observed under an optical microscope at 160x and 400x magnification. Pigment dispersion was judged similar to that obtained with traditional pellet concentrates.

Example VII

In addition, blow-molding is anticipated to be a process suited to use of the aqueous colorant system because of the tendency of the organic carrier to cause screw slippage and interfere with color incorporation, and uniform melt temperature in a high output blow-molding machine. It is expected that the water will flash-off, and have less impact on the process than existing organic systems do.

An aqueous color concentrate has been used in extrusion blow molding. The color was mixed with the virgin HDPE resin at a use rate of 0.5% on ground level, and air conveyed to the feed hopper of the extruder located on a mezzanine. A squirrel cage blower directed ambient air into the premixer to insure complete removal of moisture. Blow molded trash containers were made that were defect free and similar in appearance to those made using a pellet color concentrate. Incomplete drying of the colored resin resulted in blemishes on the surface of the blow molded parts. The formulation was stored and observed for shelf stability. After at least four months storage, the color formulation remains suitable for use without mixing.

Example VIII

Rotational molding is also considered to be an excellent area with which the present aqueous based system could be applied. Particularly, rotational molding involves using a finely ground polymer, usually polyethylene. The powder is mixed with a dry pigment mixture, in a ribbon blender perhaps, and charged into a mold. During heating, the polymer powder fuses into a solid part. Liquid colorants would provide the benefits of easier materials handling and improved housekeeping. Furthermore, liquids might mix more easily with the powder to simplify the color mixing step. However, evaluations of liquid colorants based on organic carriers have not been successful. The key limitation is that the parts have low impact strength, which seems to result from porosity in the finished parts. The porosity is likely the result of organic vapors from the liquid carrier forming bubbles in the part. In contrast, it is expected that an aqueous colorant, because of a 100% volatility of the vehicle before the polymer begins to sinter, would not have as significant of a negative effect on the impact strength of the product.

Red and yellow aqueous colorant systems were evaluated in rotational molding. A first system of 10% dispersant (Triton X-100), 50% water, and 40% red pigment (Chromophathal Red) was assembled. A second system of 10% dispersant (Triton X-100), 50% water and 40% (Ciba Irgazin Yellow) was formed. Colorants were added to 3,000 grams of stabilized polyethylene power and mixed with the powder in a Henschel lab mixer. Samples were also made with dry color for comparison. In the case of the red, the pigment content of each sample was 0.08%. In the case of the yellow, the pigment content was 0.1%. All samples dropped from the Henschel mixer with no color residue on the inside of the mixer. The aqueous colorants did not adhere to the mixer walls.

Rectangular boxes were produced and evaluated for appearance and for impact toughness. Parts were compared to an uncolored control sample. The samples were evaluated at room temperature with a Dynatup instrumented impact tester. The tup diameter was ⅜ inch. Results reflect the average of four samples. Both the yellow and red parts had uniform color with no specks or streaks.

| Sample | Total Impact Energy, ft-lb. | Failure Mode |
| --- | --- | --- |
| Uncolored control | 20.44 | Ductile |
| Dry red | 23.50 | Ductile |
| Aqueous red | 26.62 | Ductile |
| Dry yellow | 10.74 | Brittle |
| Aqueous yellow | 18.77 | Ductile/Brittle |

Example X

Polyacrylic acid dispersants are generally effective dispersants for inorganic pigments. Two different formulations were mixed with HDPE pellets in a drum and allowed to dry. One formulation contained methylcellulose as a binder and the other did not. The one containing methylcellulose allowed the colorant to adhere to the pellets so that the pellets could be conveyed to the extruder without loss of colorant. The sample without methylcellulose resulted in colorant that was loosely adhered and fell from the pellets contaminating the work area.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method of coloring a thermoplastic material comprising one of injection molding, extruding, compression molding, blow molding, or rotational molding said thermoplastic material, said thermoplastic including a colorant system comprised of:

(a) from about 10 percent to about 80 percent by weight colorant, (b) from about greater than 0 percent to about 30 percent dispersant, and (c) from about 25 percent to about 90 percent water.

2. The method of claim 1 wherein said liquid colorant includes at least 30% water.

3. The method of claim 1 wherein said liquid colorant includes at least 40% water.

4. The method of claim 1 further comprising the use of said colorant system to surface coat pellets of said thermoplastic material.

5. The method of claim 4 further comprising pretreating said coated pellets to remove said water.

* * * * *